(12) United States Patent
Hurley et al.

(10) Patent No.: US 7,114,264 B1
(45) Date of Patent: Oct. 3, 2006

(54) LENGTH ADJUSTABLE RAFTER SQUARE

(76) Inventors: Harold J. Hurley, 6538 S. 139th Cir., Omaha, NE (US) 68137; Rebbecca K. Montgomery, 6538 S. 139th Cir., Omaha, NE (US) 68137

( * ) Notice: Subject to any disclaimer, the term of this patent is extended or adjusted under 35 U.S.C. 154(b) by 0 days.

(21) Appl. No.: 11/209,560

(22) Filed: Aug. 23, 2005

(51) Int. Cl.
*B43L 7/027* (2006.01)

(52) U.S. Cl. .............................. 33/423; 33/474; 33/481

(58) Field of Classification Search ................ 33/413, 33/421, 423, 429, 474, 476, 481–482
See application file for complete search history.

(56) References Cited

U.S. PATENT DOCUMENTS

| | | | | |
|---|---|---|---|---|
| 642,888 A | * | 2/1900 | Van Vliet | 33/353 |
| 650,436 A | * | 5/1900 | Townsend et al. | 33/420 |
| 1,208,662 A | * | 12/1916 | Roth | 33/419 |
| 5,727,325 A | * | 3/1998 | Mussell | 33/429 |
| 6,314,652 B1 | * | 11/2001 | English | 33/421 |
| 6,725,556 B1 | * | 4/2004 | Graham | 33/474 |
| 2003/0164078 A1 | * | 9/2003 | Hiland, Jr. | 83/522.11 |

* cited by examiner

*Primary Examiner*—Yaritza Guadalupe-McCall
(74) *Attorney, Agent, or Firm*—Thomte, Mazour & Niebergall; Shane M. Niebergall

(57) ABSTRACT

A rafter square is provided with a triangular base plate, having a flanged base edge portion, a side edge portion, and a hypotenuse edge portion. An extension arm is selectively movable from a retracted position, closely adjacent the hypotenuse edge, to an extended position that is in-line with, but extends beyond a distal end of the side edge. Various locking mechanisms are provided for selectively locking the extension arm in either or both of its retracted or extended positions.

14 Claims, 5 Drawing Sheets

LENGTH ADJUSTABLE RAFTER SQUARE

BACKGROUND OF THE INVENTION

1. Field of the Invention

The present invention relates to rafter squares used to determine and mark the correct base cut and common cut angles for rafters and more particularly to a rafter square having a selectively extendable arm that is used to extend the marking edge of the rafter square to accommodate a user in common instances where the marking edge of the rafter square does not extend from one edge of the rafter to the opposite edge of the rafter.

2. Description of the Prior Art

Framers in the construction arts have used rafter squares for many years for determining and marking the correct base cut and common cut angles for rafters and the like. The common rafter square is provided in the form of a right-triangular plate having a flanged base leg, a side leg and a hypotenuse leg. When used for base cut marks, the rafter square is positioned on a board, with its pivot point positioned closely adjacent one edge of the board. The rafter square is pivoted until the appropriate unit rise mark, within a marking orifice formed within the rafter square, is positioned closely adjacent the edge of the board against which the pivot point is placed. Next, the user typically marks the cut line along the marking edge of the side leg. Oftentimes, however, the distance across the board, along the angle at which the marking edge is placed, is greater than the length of the measurement edge itself. In these instances, the user may simply draw a partial line using the measurement edge, reposition the rafter square, to place the hypotenuse edge adjacent the partial line, and then complete the base cut mark. However, additional steps in the marking process become time consuming and cumbersome over the course of a framer's day. Moreover, repositioning the rafter square in order to make a second attempt at the base cut mark increases the risk that the resulting mark will be inaccurate. Until the present invention, however, the only alternative to this additional step was to guess at the exact position of the remainder of the partially drawn base cut mark by drawing the remainder of the mark freehand.

Accordingly, what is needed is a rafter square that functions similarly to prior art rafter squares until a cut mark is required that is longer than one or more of the edges found on a prior art rafter square, at which time the marking edge should be capable of being selectively extended across the remainder of the board. The design of such an improved rafter square should provide ease of use in extending and retracting the marking edge in order to reduce the overall time spent using the rafter square, relative to the time spent using prior art rafter squares.

SUMMARY OF THE INVENTION

The rafter square of the present invention is generally provided with a triangular plate, having a flanged base edge, a side edge and a hypotenuse edge, which has a length that extends between a distal end of the base edge and a distal end of the side edge. An elongated extension arm is positioned adjacent, and along the hypotenuse edge of, the triangular plate. The extension arm is selectively movable between a retracted position, adjacent the hypotenuse edge, and an extended position that places at least a portion of a marking edge of the extension arm in-line with, but beyond the distal end of, the side edge. In its preferred embodiment, the extension arm moves between the retracted and extended positions by pivoting about a point located adjacent the distal end of the side edge. Similarly, the marking edge of the extension arm is preferably placed substantially in-line with the hypotenuse edge when the extension arm is disposed in its retracted position.

In a preferred embodiment, the rafter square is provided with one of several different structural means for selectively securing the extension arm in its extended position. One such embodiment provides an opening within the extension arm that is sized and shaped to receive a pivot pin, adjacent the distal end of the side edge, so that the extension arm may first be pivotally moved from its retracted position to its extended position. The extension arm may then be moved longitudinally toward the base edge until a projection extending from the extension arm is received within a pocket formed in the plate. In another embodiment, the locking means is comprised of at least one recess, formed in a side portion of the extension arm, and a projection extending outwardly from an inner wall of the triangular plate. The recess is shaped and sized to releasably receive at least a portion of the projection when the extension arm is in its extended position. Likewise, a securement means is provided for substantially preventing longitudinal movement to the extension arm when the extension arm is in its retracted position. In one such embodiment, the securement means is comprised of a notch formed in a rearward edge of the extension arm and a tooth formed within the triangular plate, adjacent its hypotenuse edge. The tooth is shaped and sized to be selectively received within the notch, preventing longitudinal movement.

In use, the rafter square of the present invention is used much in the same way that prior art rafter squares are used for determining and marking the correct base cut and common cut angles for rafters and the like. However, the extension arm may be selectively moved to its extended position where any of such cut marks are to be drawn across a distance that is greater than an edge of the triangular plate.

It is therefore a principal object of the present invention to provide a rafter square having an extension arm that is selectively moved into an extended position, placing a marking edge of the extension arm in-line with, but beyond a distal end of, a side edge of the rafter square.

A further object of the present invention is to provide a rafter square having an extension arm that is substantially embedded within the rafter square, while in a retracted position, and may be selectively pivoted to an extended position in-line with a side edge portion of the rafter square.

Still another object of the present invention is to provide a rafter square having an extension arm that may be selectively secured in either or both of a retracted position or an extended position.

A further object of the present invention is to provide a length adjustable rafter square that is simple and efficient in use.

Still another object of the present invention is to provide a length adjustable rafter square that is relatively simple and inexpensive to manufacture.

Yet another object of the present invention is to provide a length adjustable rafter square that uses fewer steps, in less time, to mark extended length cut lines than prior art rafter squares.

A further another object of the present invention is to provide a single, length adjustable rafter square that is capable of taking the place of both a small and a large rafter square.

These and other objects of the present invention will be apparent to those having skill in the art.

DESCRIPTION OF THE PREFERRED EMBODIMENT

Figure 1:
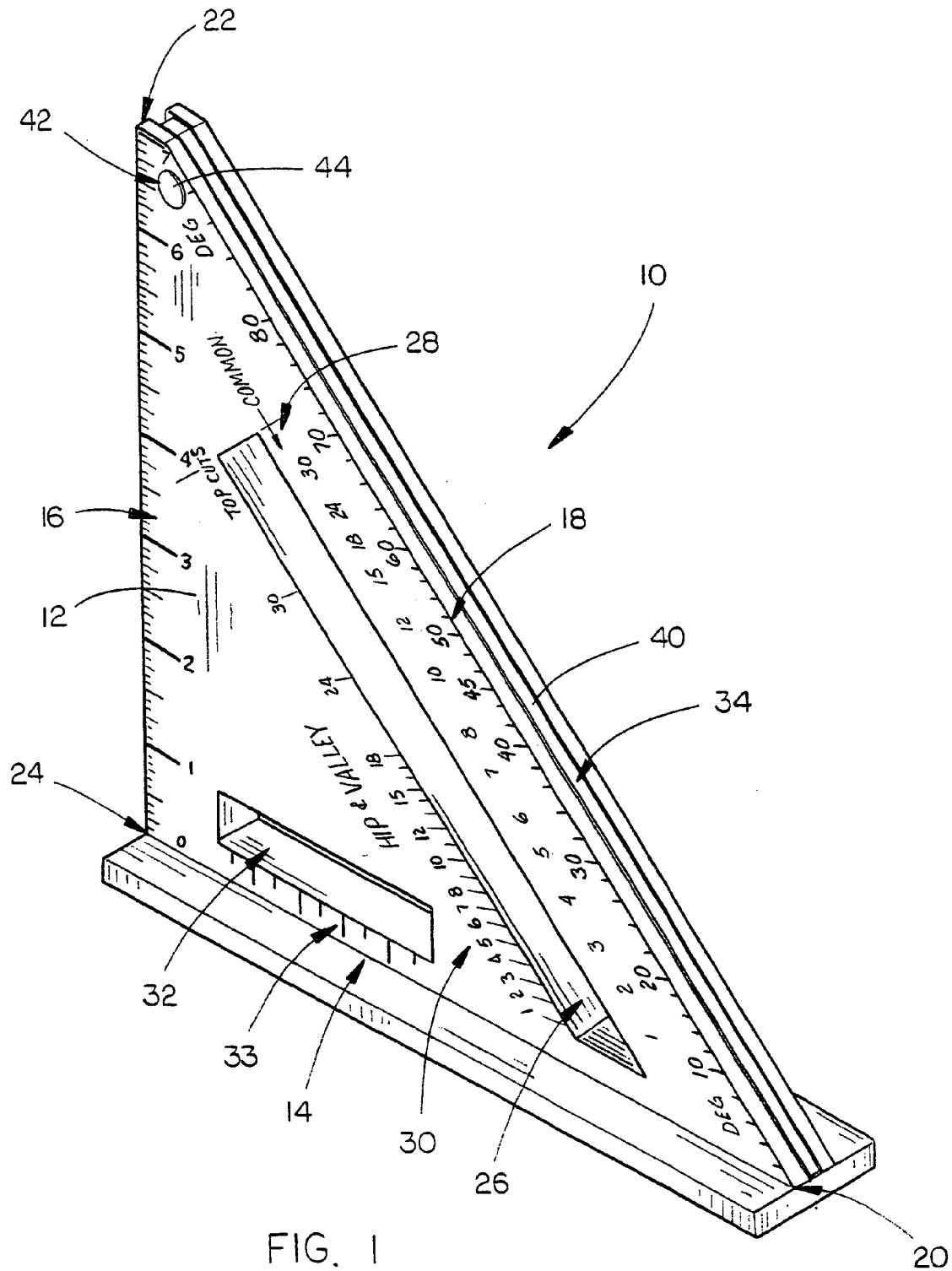
FIG. 1 is a perspective view of one embodiment of the rafter square of the present invention with the extension arm in a retracted position.

In the following detailed description of exemplary embodiments, reference is made to accompanying FIGS. 1–9, which form a part hereof and show by way of illustration exemplary embodiments of the present invention. These embodiments are disclosed in sufficient detail to enable those skilled in the art to practice the invention. It is to be understood that other embodiments may be utilized, however, and other changes may be made, without departing from the spirit or scope of the present invention. The following detailed description is, therefore, not to be taken in a limiting sense, and the scope of the present invention is defined only by the appended claims.

The rafter square 10 of the present invention is generally provided with a triangular plate 12 having a flanged base edge portion 14, a side edge portion 16, and a hypotenuse edge portion 18, which is provided to have a length that extends between a distal end 20 of the base edge 14 and a distal end 22 of the side edge 16. The base edge 14 and the side edge 16 meet to form a generally right angle at a pivot point 24. As is common to most rafter squares, the present rafter square 10 is provided with an elongated marking office 26 that is formed through the triangular plate 12 adjacent, and generally parallel to, the hypotenuse edge 18. A common cut scale 28 is disposed along one edge of the marking orifice 26 and a hip and valley cut scale 30 is disposed along an opposite edge portion of the marking orifice 26. Similarly, a second orifice 32 is formed through the triangular plate 12, adjacent the base edge 14. A plurality of measurement marks 33 are disposed along at least one edge of the second orifice 32.

An elongated extension arm 34, having a first end portion 36 and a second end portion 38, is preferably positioned adjacent to and along the hypotenuse edge 18. The extension arm 34 should be provided in a manner that permits selective movement between a retracted position, adjacent to and along the hypotenuse edge 18 (FIG. 1), and an extended position that places at least a portion of a marking edge 40 of the extension arm 34 in-line with, but beyond the distal end portion 22 of the side edge 16 (FIG. 2). Thus it can be seen that the adjustable nature of the rafter square 10 of the present invention permits it to take the place of both a small and a large rafter square, reducing the number of tools carried by an individual.

In a preferred embodiment, the extension arm 34 moves between its retracted and extended positions about a pivot point 42 adjacent the distal end 22 of the side edge 16. More specifically, a pivot pin 44 is coupled with the triangular plate 12 adjacent the distal end 22 of the side edge 16. The pivot pin 44 is disposed through an opening 46 formed in the first end portion 36 of the extension arm 34. The pivot pin 44 and the opening 46 should be sized and shaped to permit a smooth pivoting motion from the retracted position to the extended position.

Figures 2, 3:
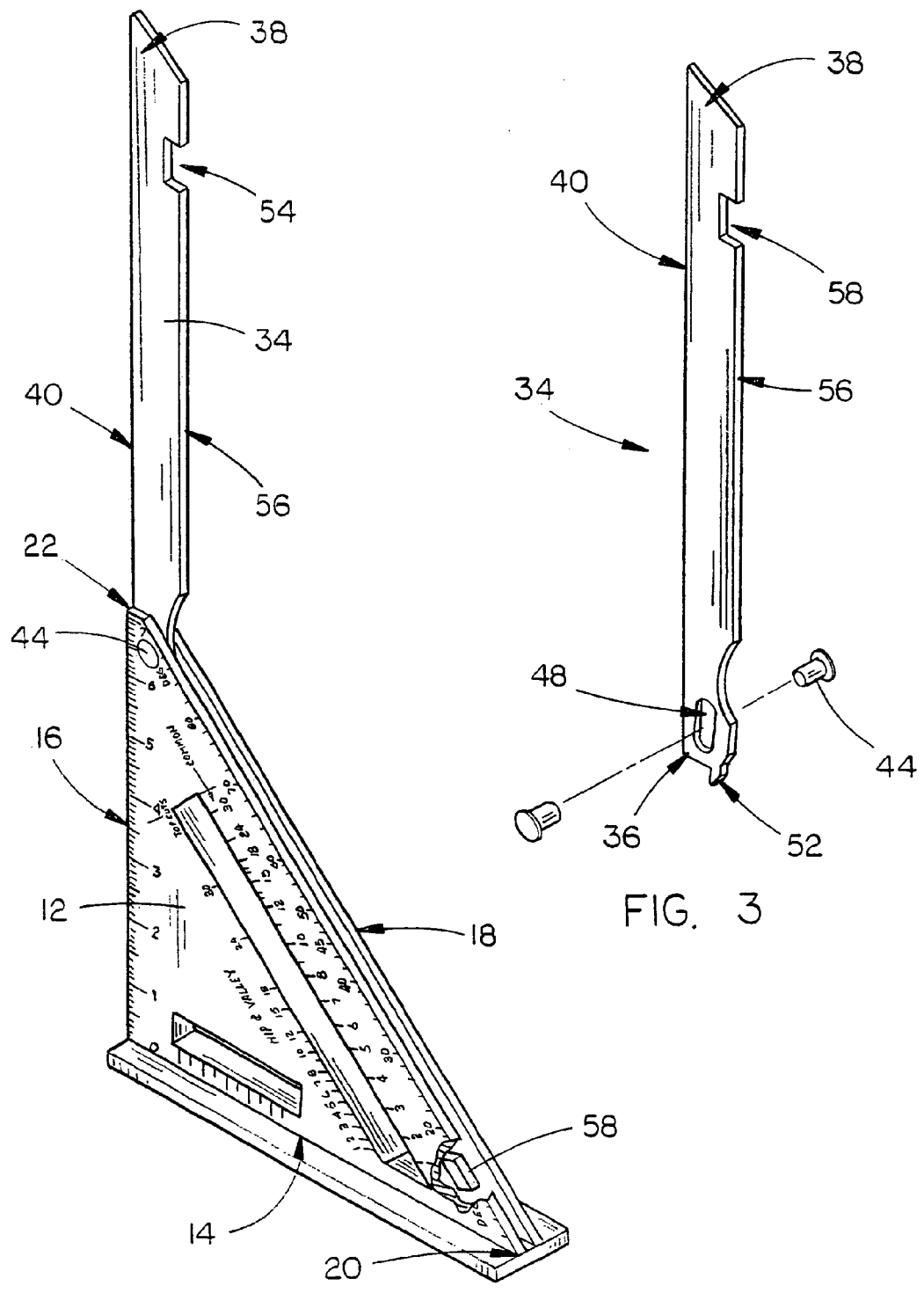
FIG. 2 is a perspective view of the rafter square depicted in FIG. 1 with the extension arm in an extended position.
FIG. 3 depicts one embodiment of an extension arm and pivot pin that may be used with the rafter square of the present invention.

It will also be preferred that the extension arm 34 be coupled with the triangular plate 12 in a manner that disposes the marking edge 40 of the extension arm 34 in a position that is substantially in-line with the hypotenuse edge 18 when the extension arm 34 is in its retracted position, as depicted in FIG. 1. This will permit normal functional use of the hypotenuse edge 18 as a marking edge when the extension arm 34 is retracted. In a preferred embodiment, the extension arm 34 is substantially embedded within the triangular plate 12, adjacent the hypotenuse edge 18, when the extension arm 34 is in its retracted position. Again, this will permit use of the hypotenuse edge 38 as a marking edge when the extension arm 34 is in its retracted position. While it is contemplated that the extension arm 34 could be coupled to one of the two opposing surfaces of the triangular plate 12, doing so will cause the rafter square 10 to not sit flush against an operating surface when the triangular plate 12 is positioned with the side coupled to the extension arm 34 facing against the operating surface.

Figure 5:
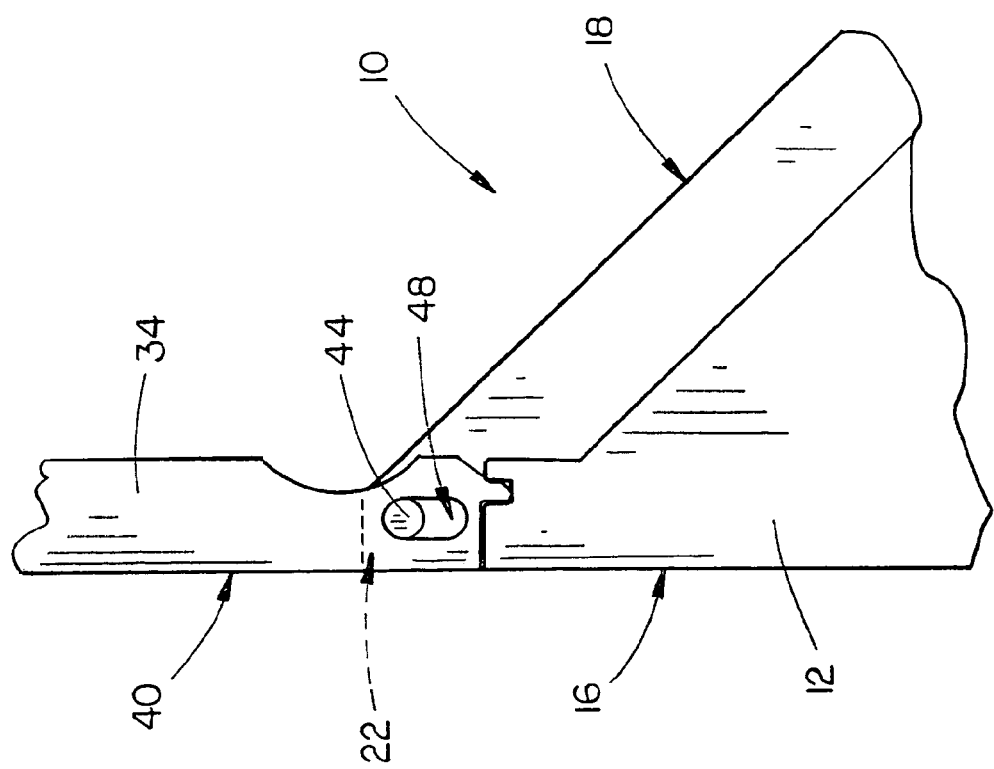
FIG. 5 is a partial, side elevation view of the rafter square depicted in FIG. 4 with the extension arm is in an extended position.
Figure 4:
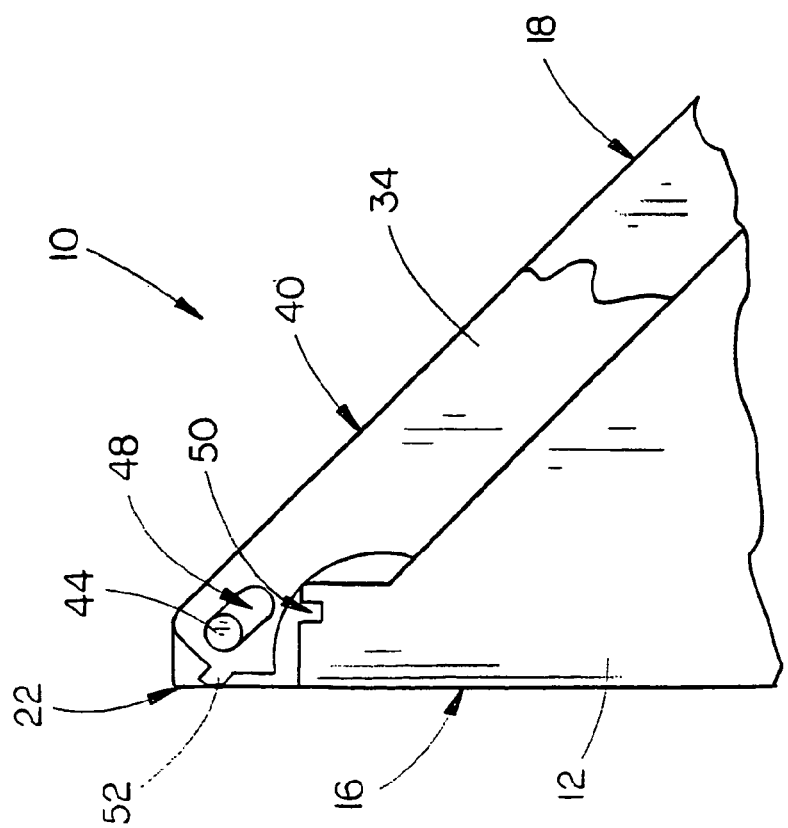
FIG. 4 is a partial, side elevation view of another embodiment of the rafter square of the present invention, demonstrating one embodiment of the locking means while the extension arm is in a retracted position.

It is contemplated that the pressure applied by a marking instrument along the side edge 16 and the marking edge 40 of the extension arm 34 could cause the extension arm 34 to move out of line with the side edge 16, causing a crooked or incomplete cut mark. Accordingly, a preferred embodiment of the rafter square 10 will be comprised of a locking means for selectively securing the extension arm 34 in its extended position. In one embodiment, the locking means is comprised of an enlarged opening 48 formed within the extension arm 34. The opening 48 is sized and shaped to receive the pivot pin 44 adjacent the distal end 22 of the side edge 16 so that the extension arm may first be pivotably moved from its retracted position to its extended position and then moved longitudinally toward the base edge 14, as depicted in FIGS. 4 and 5. A pocket 50 is formed within the triangular plate 12, adjacent the distal end 22 of the side portion 16. The pocket 50 is preferably sized and shaped to releasably receive a projection 52 that is formed into the first end 36 of the extension arm 34. Accordingly, when the extension arm 34 is longitudinally moved toward the base edge 14, the projection 52 seats within the pocket 50, securing the extension arm 34 in its extended position. The extension arm 34 may be released by longitudinally moving the extension arm 34 away from the base edge 14. In this position, the extension arm 34 may be selectively pivoted back toward its retracted position.

Figure 7:
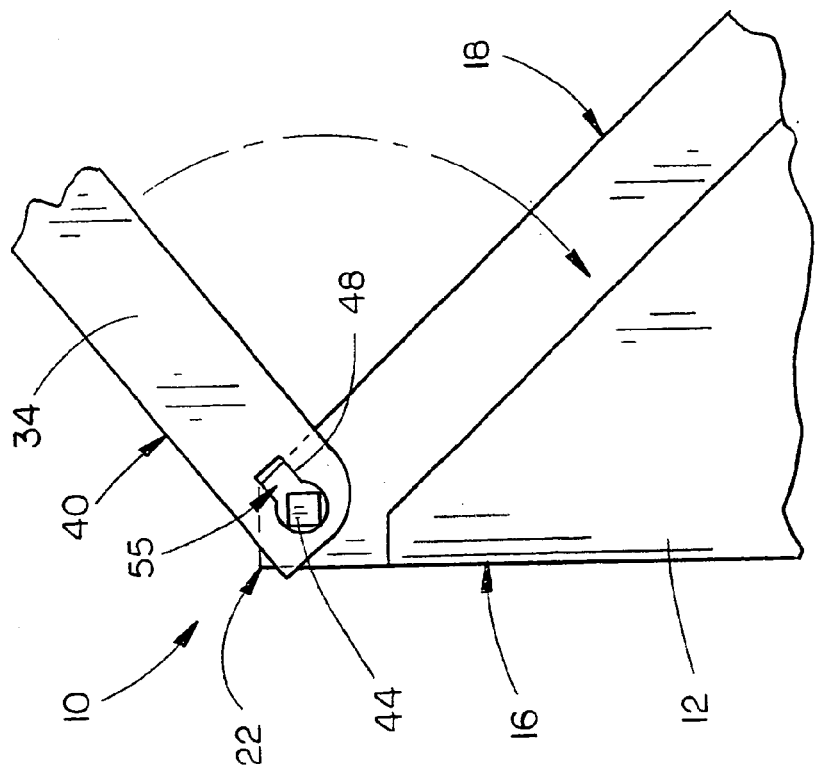
FIG. 7 is a partial, side elevation view of the rafter square depicted in FIG. 6 depicting the extension arm as it could be moved into a retracted position.
Figure 6:
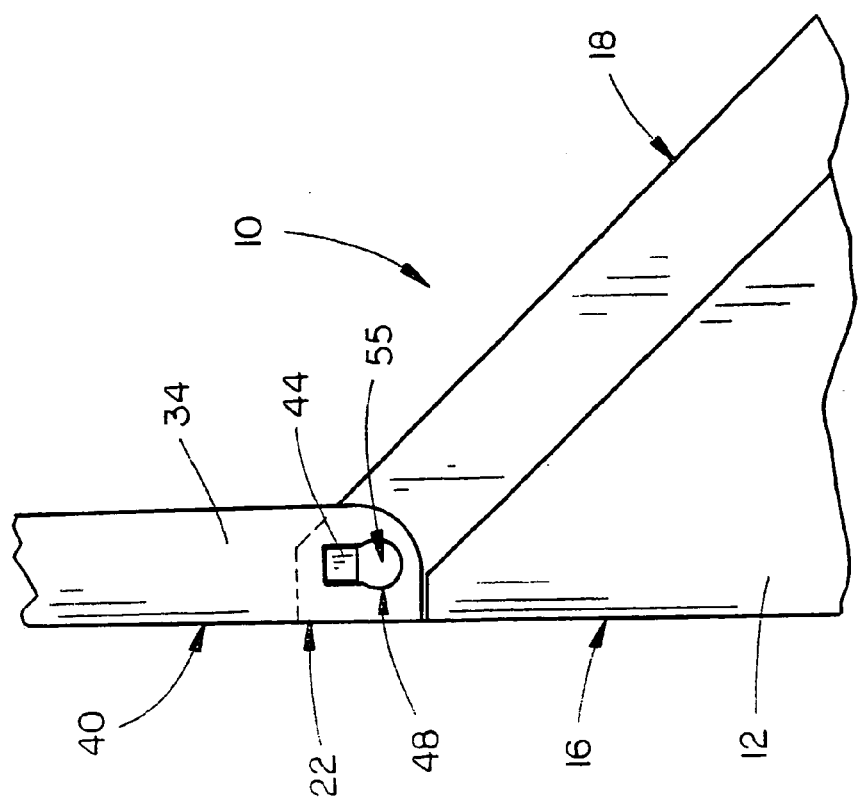
FIG. 6 is a partial, side elevation view of yet another embodiment of the rafter square of the present invention, demonstrating one embodiment of the locking means while the extension arm is in an extended position.

In another preferred embodiment, the enlarged opening 48 and pivot pin 44 are shaped and sized to permit free rotation of the extension arm 34 about the pivot pin 44 at a first end portion 53 of the enlarged opening 48 and non-rotational, longitudinal movement at a second end portion 55 of the enlarged opening 48. Specifically, as depicted in FIGS. 6 and 7, the first end portion 53 of the opening may be provided with a generally curved peripheral edge and the second end portion 55 may be provided with a generally rectangular peripheral edge. In this manner, an appropriately sized and polygonal-shaped pivot pin 44 will be allowed to freely rotate within the first end portion 53 of the enlarged opening 48. However, the same pivot pin 44 will only be allowed to enter, and slide longitudinally within, the second end portion 55 of the enlarged opening 48 when the extension arm 34 is positioned in a particular manner, such as the fully extended position. It will be apparent that pivot pins having a square, hexagonal, octagonal or other similarly shaped cross-section will suffice for this purpose. Moreover, its is contemplated that the shape and size of the enlarged opening 48 and the pivot pin 44 may be provided to permit rotational, non-longitudinal movement of the extension arm 34 when the extension arm 34 is in its retracted position. In this manner, the locking means serves a dual role as a securement means for preventing longitudinal movement of the extension arm 34 in its retracted position.

Figure 9:
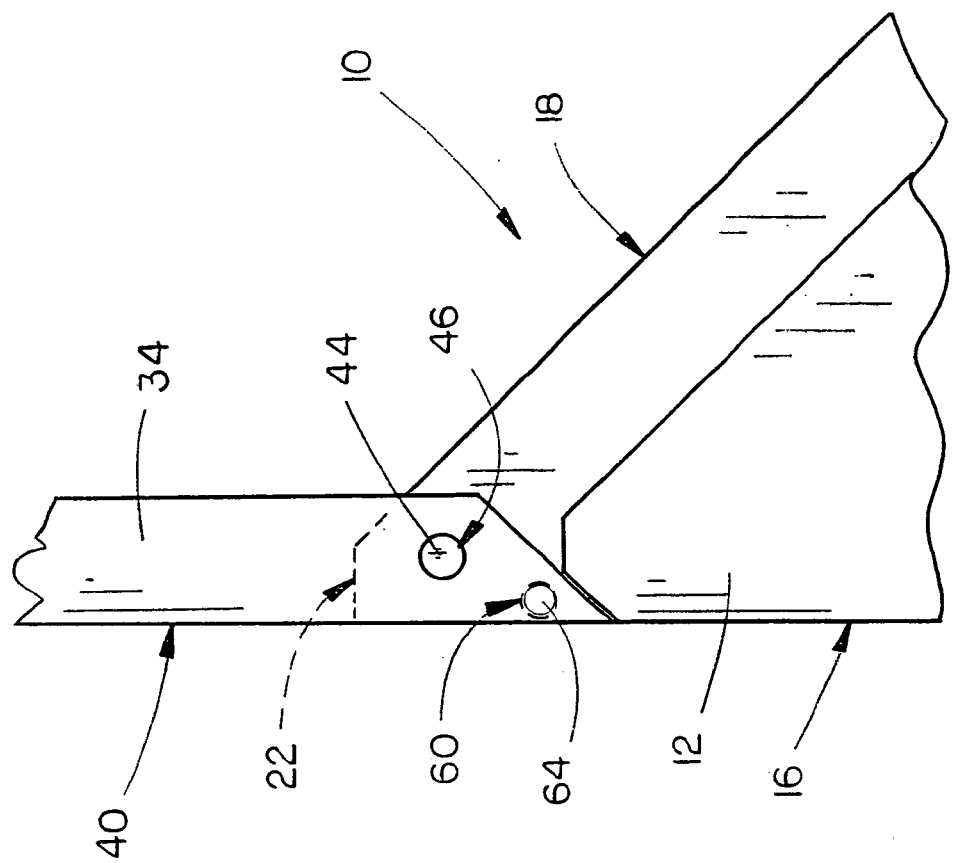
FIG. 9 is a partial, side elevation view of the rafter square depicted in FIG. 8 of the extension arm in an extended position.
Figure 8:
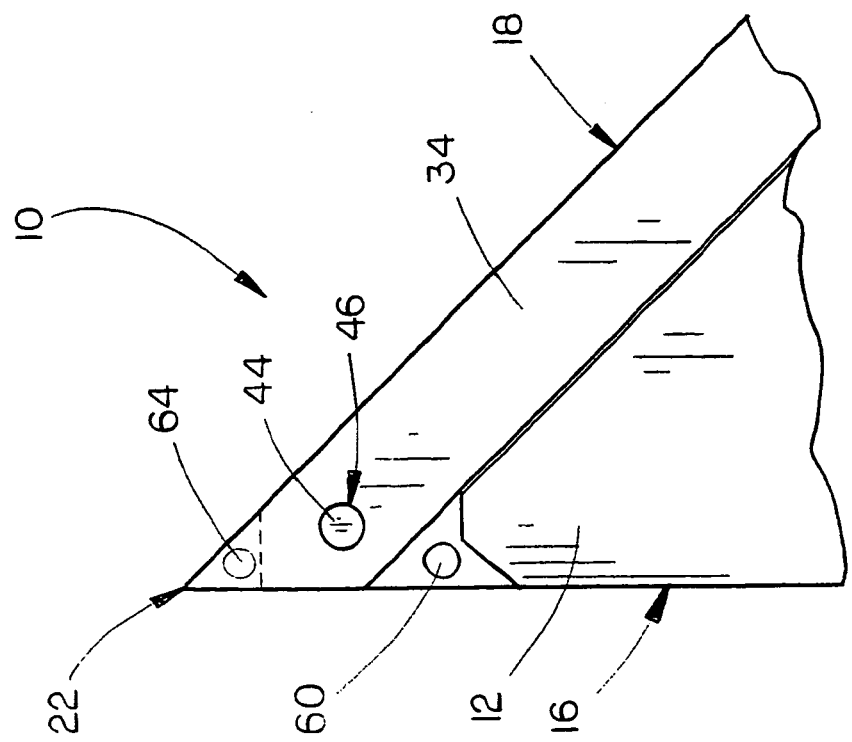
FIG. 8 is a partial, side elevation view of still another embodiment of the rafter square of the present invention, demonstrating one embodiment of the locking means while the extension arm is in a retracted position.

In still another embodiment, depicted in FIGS. 8 and 9, a locking means may be provided by forming at least one recess 60 in a side portion 62 of the extension arm 34 and a projection 64 that extends outwardly from an inner wall 66 of the triangular plate 12. The recess 60 is preferably shaped and size to releasably receive at least a portion of the projection 64 to secure the extension arm 34 in its extended position. it is contemplated that a plurality of such recesses and projections could be provided. Likewise, a similar arrangement of projections and recesses could be used as a securement means for preventing longitudinal movement of the extension arm 34 in its retracted position.

Where the aforementioned embodiment of locking means is not provided, it may still be desirable to provide a securement means for preventing longitudinal movement of the extension arm 34 when it is in its retracted position. Accordingly, the securement means may alternatively be provided in the form of a notch 54, formed in a rearward edge 56 of the extension arm 34, and a tooth 58, which is formed within the triangular plate 12 adjacent the hypotenuse edge 18. Accordingly, the tooth 58 should be shaped and sized to be removably received within the notch 54 when the extension arm 34 is disposed in its retracted position. Engagement between the notch 54 ad the tooth 58 will substantially limit longitudinal travel of the extension arm 34.

In the drawings and in the specification, there have been set forth preferred embodiments of the invention and although specific items are employed, these are used in a generic and descriptive sense only and not for purposes of limitation. Changes in the form and proportion of parts, as well as a substitution of equivalents, are contemplated as circumstances may suggest or render expedient without departing from the spirit or scope of the invention as further defined in the following claims.

Thus it can be seen that the invention accomplishes at least all of its stated objectives.

We claim:

1. A rafter square, comprising:
 a triangular plate, having a flanged base edge, a side edge and a hypotenuse edge having a length that extends between a distal end of said base edge and a distal end of said side edge;
 an elongated extension arm, having opposite first and second end portions, positioned adjacent and along said hypotenuse edge;
 said extension arm being selectively movable between a retracted position, adjacent and along said hypotenuse edge, and an extended position that places at least a portion of a marking edge of said extension arm in-line with, but beyond the distal end of, said side edge;
 said extension arm moving between said retracted position and said extended position about a pivot point adjacent the distal end of said side edge; and
 locking means for selectively securing said extension arm in said extended position; said locking means being comprised of an opening formed within said extension arm that is sized and shaped to receive a pivot pin adjacent the distal end of said side edge so that said extension arm may first be pivotally moved from said retracted position to said extended position and them moved longitudinally toward said base edge; said locking means is further comprised of a pocket formed within said plate, adjacent the distal end of said side portion; said pocket being shaped and sized to releasably receive a projection formed into an end portion of said extension arm.

2. The rafter square of claim 1 wherein the marking edge of said extension arm is substantially in-line with said hypotenuse edge when said extension arm is in said retracted position.

3. The rafter square of claim 1 wherein said extension arm is substantially embedded within said triangular plate, adjacent said hypotenuse edge, when said extension arm is in said retracted position.

4. The rafter square of claim 1 comprising a second locking means for substantially preventing longitudinal movement of said extension arm when said extension arm is in said retracted position.

5. The rafter square of claim 4 wherein said second locking means is comprised of a notch formed in a second edge of said extension arm and a tooth formed within said plate adjacent said hypotenuse edge; said tooth being shaped and sized to be selectively received within said notch.

6. The rafter square of claim 1 comprising a securement means for substantially preventing longitudinal movement of said extension arm when said extension arm is in said retracted position.

7. The rafter square of claim 6 wherein said second locking means is comprised of a notch formed in a rearward edge of said extension arm and a tooth formed within said plate adjacent said hypotenuse edge; said tooth being shaped and sized to be selectively received within said notch.

8. A rafter square, comprising:
 a triangular plate, having a flanged base edge, a side edge and a hypotenuse edge having a length that extends between a distal end of said base edge and a distal end of said side edge;
 an elongated extension arm, having opposite first and second end portions, positioned adjacent and along said hypotenuse edge;
 said extension arm being selectively movable between a retracted position, adjacent and along said hypotenuse edge, and an extended position that places at least a portion of a marking edge of said extension arm in-line with, but beyond the distal end of, said side edge;
 said extension arm moving between said retracted position and said extended position about a pivot point adjacent the distal end of said side edge; and locking means for selectively securing said extension arm in said extended position; said locking means being comprised of an opening formed within said extension arm that is sized and shaped to receive a pivot pin adjacent the distal end of said side edge so that said extension arm may first be pivotally moved from said retracted position to said extended position and them moved longitudinally toward said base edge; said pivot pin and said opening being shaped and sized to permit free rotation of said extension arm about said pivot pin at a first end portion of said opening and non-rotational, longitudinal movement at a second end portion of said opening.

9. The rafter square of claim 8 wherein said pivot pin and opening are sized and shaped to permit rotational, non-longitudinal movement of said extension arm when said extension arm is in said retracted position.

10. The rafter square of claim 9 wherein the first end portion of said opening is provided with a generally curved peripheral edge and the second end portion of said opening is provided with a generally rectangular peripheral edge.

11. The rafter square of claim 8 wherein said extension arm is substantially embedded within said triangular plate, adjacent said hypotenuse edge, when said extension arm is in said retracted position.

12. The rafter square of claim 8 comprising a second locking means for substantially preventing longitudinal movement of said extension arm when said extension arm is in said retracted position.

13. A rafter square, comprising:
a triangular plate, having a flanged base edge, a side edge and a hypotenuse edge having a length that extends between a distal end of said base edge and a distal end of said side edge;
an elongated extension arm, having opposite first and second end portions, positioned adjacent and along said hypotenuse edge;
said extension arm being selectively movable between a retracted position, adjacent and along said hypotenuse edge, and an extended position that places at least a portion of a marking edge of said extension arm in-line with, but beyond the distal end of, said side edge;
said extension arm moving between said retracted position and said extended position about a pivot point adjacent the distal end of said side edge; and
locking means for selectively securing said extension arm in said extended position; said locking means being comprised of at least one recess, formed in a side portion of said extension arm, and a projection extending outwardly from an inner wall of said triangular plate; said recess being shaped and sized to releasably receive at least a portion of said projection.

14. The rafter square of claim 13 comprising a second locking means for substantially preventing longitudinal movement of said extension arm when said extension arm is in said retracted position.

* * * * *